(12) United States Patent
Yi

(10) Patent No.: US 12,527,807 B2
(45) Date of Patent: Jan. 20, 2026

(54) DRUG COMPOSITION CONTAINING ABIRATERONE ACETATE, AND PREPARATION METHOD THEREFOR AND APPLICATION THEREOF

(71) Applicant: HUNAN HUIZE BIO-PHARMACEUTICAL CO., LTD., Changsha (CN)

(72) Inventor: Mulin Yi, Changsha (CN)

(73) Assignee: Hunan Huize Bio-pharmaceutical Co., Ltd., Changsha (CN)

( * ) Notice: Subject to any disclaimer, the term of this patent is extended or adjusted under 35 U.S.C. 154(b) by 972 days.

(21) Appl. No.: 17/704,300

(22) Filed: Mar. 25, 2022

(65) Prior Publication Data

US 2022/0265682 A1    Aug. 25, 2022

Related U.S. Application Data

(63) Continuation-in-part of application No. PCT/CN2020/090866, filed on May 18, 2020.

(30) Foreign Application Priority Data

Sep. 26, 2019    (CN) .......................... 201910916636.3

(51) Int. Cl.
*A61K 31/58* (2006.01)
*A61K 9/107* (2006.01)
*A61K 47/44* (2017.01)

(52) U.S. Cl.
CPC .............. *A61K 31/58* (2013.01); *A61K 9/107* (2013.01); *A61K 47/44* (2013.01)

(58) Field of Classification Search
CPC ........ A61K 31/58; A61K 9/107; A61K 47/44; A61K 47/26; A61K 9/08; A61K 9/4858; A61K 47/10; A61K 47/14; A61K 9/1075; A61K 9/4808; A61P 13/08; A61P 35/00; A61P 35/04
See application file for complete search history.

(56) References Cited

U.S. PATENT DOCUMENTS

| 5,342,625 A * | 8/1994 | Hauer | A61K 38/13 514/975 |
|---|---|---|---|
| 2018/0125863 A1* | 5/2018 | Williams | A61K 47/44 |

FOREIGN PATENT DOCUMENTS

| CN | 102961358 A | 3/2013 |
|---|---|---|
| CN | 103813794 A | 5/2014 |
| CN | 105055314 A | 11/2015 |
| CN | 105535979 A | 5/2016 |
| CN | 106821977 A | 6/2017 |
| CN | 107073127 A | 8/2017 |
| CN | 107278152 A | 10/2017 |
| CN | 107468650 A | 12/2017 |
| CN | 110538150 A | 12/2019 |
| CN | 110753545 A | 2/2020 |
| CN | 111012745 A | 4/2020 |
| CN | 106692051 B | 1/2021 |
| CN | 113456588 A | 10/2021 |
| CN | 113616614 A | 11/2021 |
| CN | 113750032 A | 12/2021 |
| EP | 3854384 A1 | 7/2021 |
| EP | 4035657 A1 | 8/2022 |
| TW | 201513896 A | 4/2015 |
| WO | 2014009434 A1 | 1/2014 |
| WO | 2014145813 A1 | 9/2014 |
| WO | 2015193380 A2 | 12/2015 |
| WO | 2018191141 A1 | 10/2018 |
| WO | 2021057042 A1 | 4/2021 |

OTHER PUBLICATIONS

Extended European Search Report for European Application No. 20867834.2 dated Oct. 10, 2022; 10 pgs.
Pouton, Colin W., "Formulation of self-emulsifying drug delivery systems," Advanced Drug Delivery Reviews, 1997; 25:47-58.
PCT International Search Report and Written Opinion, International Application No. PCT/CN2020/090866, International Filing Date May 18, 2020, 10 pages.
Tong et al., "Clinical progress of abiraterone in the treatment of metastatic prostatic cancer," Chinese Journal of Biochemical and Pharmaceutics, vol. 36, No. 7, Dec. 31, 2016, ISSN: 1005-1678, pp. 205-208 and 212.
Boleslavska et al., "Bioavailability Enhancement and Food Effect Elimination of Abiraterone Acetate by Encapsulation in Surfactant-Enriched Oil Marbles," The AAPS Journal, 2020; 22:122; 12 pgs.
Extended European Search Report for European Patent Application No. 22212792.0 dated May 4, 2023; 12 pgs.
First Office Action for Chinese Application No. 202210049441.5 dated Aug. 19, 2022; 5 pgs.
First Office Action for Japanese Patent Application No. 2022-198156 dated Apr. 11, 2023; 3 pgs.
Notice of Allowance for Chinese Application No. 202210049441.5 dated Sep. 13, 2022; 3 pgs.
Penjuri et al., "Development of Self Emulsifying Formulations of Poorly Soluble Naproxen for Enhanced Drug Delivery," Recent Patents on Drug Delivery & Formulation, 2016; 10(3):235-244.
Taiwan Patent Office, Decision of Refusal, Taiwan application No. 109131997, issued Aug. 30, 2022, 4 pages.

* cited by examiner

*Primary Examiner* — Robert A Wax
*Assistant Examiner* — John Seungjai Kwon
(74) *Attorney, Agent, or Firm* — Umberg Zipser LLP

(57) ABSTRACT

A drug composition containing abiraterone acetate, and a preparation method therefor and an application thereof. Excipients thereof comprise at least one oil phase, at least one emulsifier, and at least one co-emulsifier. The dug composition can obviously improve the bioavailability and the stability of a preparation. The drug composition can be further prepared as capsules.

15 Claims, 3 Drawing Sheets

DRUG COMPOSITION CONTAINING ABIRATERONE ACETATE, AND PREPARATION METHOD THEREFOR AND APPLICATION THEREOF

The present application is a continuation-in-part of International Application No. PCT/CN2020/090866, filed on May 18, 2020, and claims the priority benefit of Chinese patent application under the title of "DRUG COMPOSITION CONTAINING ABIRATERONE ACETATE, AND PREPARATION METHOD THEREFOR AND APPLICATION THEREOF" with the application number of 201910916636.3 filed with CNIPA on Sep. 26, 2019, which is herein incorporated with its entirety.

FIELD OF THE INVENTION

The present invention relates to the technical field of pharmaceutical preparation, in particular to a pharmaceutical composition containing abiraterone acetate, and a preparation method therefor and application thereof.

BACKGROUND OF THE INVENTION

Abiraterone acetate is a white to gray white crystalline powder without hygroscopicity, chemically named (3β)-17-(3-pyridinyl)androsta-5, 16-dien-3-ol acetate, and its molecular formula is $C_{26}H_{33}NO_2$. Abiraterone acetate is transformed into an androgen biosynthesis inhibitor abiraterone in vivo, which inhibits 17α-hydroxylase/C17,20-lyase (CYP17). It can be used in combination with prednisone for the treatment of patients with metastatic castration-resistant prostate cancer (CRPC) who ever received with polyene paclitaxel chemotherapy. However, abiraterone acetate is a lipophilic compound, and its octanol-water partition coefficient is 5.12 (Log P) and the pKa of nitrogen in aromatic group is 5.19. It is almost insoluble in water (less than 0.01 mg/ml) and has poor permeability. It is a BCS Class IV drug, and its bioavailability is extremely low when orally administrated.

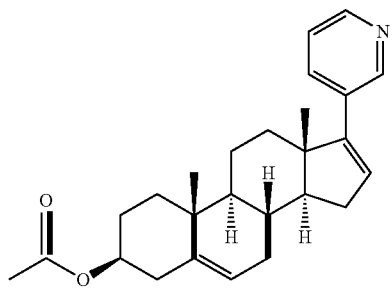

The original drug of Abiraterone acetate, Zytiga, is in a tablet form. Each tablet of Zytiga contains 250 mg of abiraterone acetate, and its inactive ingredient comprises: colloidal silica, croscarmellose sodium, lactose monohydrate, magnesium stearate, microcrystalline cellulose, polyvidone and sodium dodecyl sulfate. The oral bioavailability of Zytiga is very low (less than 10%); a single dose can be up to 1000 mg, but only less than 10% of the drug can exert its efficacy.

In addition, food has a great influence on the absorption of abiraterone acetate. A commercially available formulation requires that it can only be taken at a specific time period before meals. The instruction of Zytiga emphasizes that an amount of systemic exposure of abiraterone increases when abiraterone acetate is given with food. The $C_{max}$ and $AUC_{0-\infty}$ for abiraterone increase by about 7 times and 5 times respectively when abiraterone acetate is given with a low-fat diet (7% fat, 300 calories), while the $C_{max}$ and $AUC_{0-\infty}$ is increased by about 17 times and 10 times respectively when abiraterone acetate is given with a high-fat diet (57% fat, 825 calories). Taking into account the normal changes in the content and composition of the diet, it may result in an increased and highly variable exposure amount when abiraterone acetate is taken with the diet. Abiraterone acetate needs to be taken on an empty stomach, and one should not have meal within at least two hours before taking the dose and at least one hour after taking the dose in order to control the plasma concentration of abiraterone. Although abiraterone acetate has a good efficacy in the treatment of advanced prostate cancer through oral administration, its characteristics of low solubility and poor permeability bring some obstacles to the formulation design.

Yonsa, manufactured by Sun Pharmaceutical Industries Ltd. from India using SoluMatrix particulate technology, is a modified abiraterone acetate tablet, which can promote the dissolution of abiraterone acetate and double the oral bioavailability of the original drug Zytiga. Although the dose of Yonsa is reduced to 500 mg, it only changes the crystal form and the size of the drug and improves the drug dissolution rate, but fails to increase the permeability of abiraterone acetate on the gastrointestinal epithelial cells. Therefore, the oral bioavailability of Yonsa is still very low.

Patent document CN107278152A relates to a complex of abiraterone acetate, a preparation method thereof and a pharmaceutical composition comprising them. The complex comprises 5 to 40% by weight of abiraterone acetate, 5 to 80% by weight of polyvinyl caprolactam-polyvinyl acetate-polyethylene glycol graft copolymer, 0.1 to 50% by weight of sodium deoxycholate. The complex can reduce the influence of food and cancel the requirement of taking on an empty stomach, and increase the oral bioavailability up to 5 times. However, the preparation process for the complex formulation is complicated.

SUMMARY OF THE INVENTION

The objective of the present invention is to provide a pharmaceutical composition that can significantly improve the oral absorption of abiraterone acetate.

It is known to those skilled in the art that, due to the low solubility and the poor permeability of abiraterone acetate, formulating it into a self-emulsifying solution is expected to eliminate the difference between pre-meal and post-meal administration of abiraterone acetate and improve an oral bioavailability of the drug. However, abiraterone acetate has a low solubility in various solvents and emulsifiers. Although the drug may be quickly dissolved at high temperatures, it is easy to precipitate crystals and lose self-emulsifying properties when stored at room temperature. Moreover, the dosage of abiraterone acetate is large, and the self-emulsifying solution that needs to be designed must have a high drug content and be able to be stable at normal temperature. The above-mentioned technical difficulties have become a major bottleneck in the design of the formulation. In addition, whether the self-emulsifying solution can spontaneously form a uniform and stable nanoemulsion with water is another difficulty in the design of the formulation.

After in-depth research, the inventor found that by preparing a composition of abiraterone acetate and specific excipients allows its oral bioavailability to be increased to ten times compared to the original drug Zytiga.

The present invention adopts the following technical solutions:
a pharmaceutical composition containing abiraterone acetate, comprising (consisting of the following components):
an active ingredient: abiraterone acetate; and
excipients: at least one oil phase;
at least one emulsifier; and
at least one co-emulsifier.

In the pharmaceutical composition containing abiraterone acetate of the present application, the concentration of abiraterone acetate ranges from 20 to 100 mg/mL based on the total volume of the excipients.

The pharmaceutical composition of the invention is a solution and is easy to form a nanoemulsion with water, and can increase dissolution of the medicament, promote the absorption and improve the bioavailability.

The excipient (homogeneous transparent solution consists of oil phase, emulsifier and co-emulsifier) of the pharmaceutical composition of the invention serves as a carrier for medicaments that are hydrophobic, difficult to absorb or easy to hydrolyze. Upon oral administration, the excipient spontaneously disperses into the gastrointestinal fluid under gastrointestinal peristalsis to form an O/W nanoemulsion (oil-in-water nanoemulsion). The formed nanoemulsion has a small particle size and an increased penetration for intestinal epithelial cells, and provides a significantly improved bioavailability of the medicament. Compared with microemulsions, the self-emulsifying solution has a higher stability, and can meet the requirements of long-term storage. Besides, it can also be directly packed into soft capsules or hard capsules.

Abiraterone acetate accounts for 2 to 20%, preferably 5 to 15%, more preferably 5 to 10%, even more preferably 2.5 to 10% of the total mass of the pharmaceutical composition.

The pharmaceutical composition containing abiraterone acetate according to the present invention has at least one of the following properties.
a) After mixing with water, it can spontaneously form a nanoemulsion with a particle size of less than 250 nm having high clarity, uniform particle size and stable properties.
b) The contents can exist in the form of a stable solution when stored at room temperature.
c) The difference between pre-meal and post-meal administration is significantly reduced compared to the original drug Zytiga.
d) The oral bioavailability is increased by several times to ten times compared to the original drug Zytiga.

Preferably, the pharmaceutical composition containing abiraterone acetate according to the present invention comprises an oil phase which is one or at least two selected from the group consisting of hydrogenated castor oil, glyceryl monooleate, propylene glycol monocaprylate, corn oil, soybean oil, medium chain triglycerides, ethyl oleate, and glyceryl monolinoleate.

The oil phase accounts for 20 to 50%, preferably 20 to 45%, and more preferably 25 to 45% of the total mass of the pharmaceutical composition containing abiraterone acetate.

Preferably, the oil phase is one or at least two selected from the group consisting of hydrogenated castor oil, glyceryl monooleate, propylene glycol monocaprylate, soybean oil, medium chain triglycerides, ethyl oleate, and glyceryl monolinoleate. More preferably, the oil phase is one or at least two selected from the group consisting of glyceryl monolinoleate, medium chain triglycerides, hydrogenated castor oil, and glyceryl monooleate.

Preferably, the pharmaceutical composition containing abiraterone acetate according to the present invention comprises an emulsifier which is one or at least two selected from the group consisting of polyoxyethylene castor oil EL35, polyoxyethylene 40 hydrogenated castor oil, Span 80, Tween 80, polyethylene glycol-15 hydroxystearate (Solutol), and polyethylene caprolactam-polyvinyl acetate-polyethylene glycol graft copolymer (Soluplus).

The emulsifier accounts for 8 to 70%, preferably 8 to 50%, more preferably 8 to 35%, or preferably 20 to 70%, more preferably 10 to 50%, even more preferably 10 to 35% of the total mass of the pharmaceutical composition.

Preferably, the emulsifier is one or at least two selected from the group consisting of polyoxyethylene castor oil EL35, polyoxyethylene 40 hydrogenated castor oil, Span 80, and polyethylene caprolactam-polyvinyl acetate-polyethylene glycol graft copolymer (Soluplus). More preferably, the emulsifier is polyoxyethylene castor oil EL35 or polyoxyethylene 40 hydrogenated castor oil.

Preferably, the pharmaceutical composition containing abiraterone acetate according to the present invention comprises a co-emulsifier which is one or at least two selected from the group consisting of ethanol, propylene glycol, polyethylene glycol 400, and diethylene glycol monoethyl ether.

The co-emulsifier accounts for 20 to 80%, preferably 20 to 60%, more preferably 20 to 50%, and still more preferably 30 to 50% of the total mass of the pharmaceutical composition containing abiraterone acetate.

More preferably, the co-emulsifier is a combination of propylene glycol and ethanol, the content of which is more preferably 20 to 30%; or diethylene glycol monoethyl ether, the content of which is more preferably 25 to 50%.

In the composition of the present invention, the total content of all clearly listed components is less than or equal to 100 wt. %.

Without being limited to any theory, the inventor of the present invention unexpectedly discovered that the specific co-emulsifier of the invention, together with the oil phase and the emulsifier, forms a uniform and transparent solution, which serves as a carrier for medicaments that are hydrophobic, difficult to absorb or easy to hydrolyze. Upon oral administration, the pharmaceutical composition containing the co-emulsifier of the invention disperses into gastrointestinal fluid under gastrointestinal peristalsis to spontaneously form an O/W nanoemulsion (oil-in-water nanoemulsion). The formed nanoemulsion has a small particle size and an increased penetration for intestinal epithelial cells, and provides a significantly promoted absorption and improved bioavailability. The pharmaceutical composition of the present invention can also significantly reduce the influence of food on the absorption of abiraterone acetate, reduce the difference between pre-meal and post-meal administration, so that the drug can be taken both under empty-stomach and full-stomach conditions, and the restriction for the time of taking medicament is reduced.

In a preferred embodiment of the present invention, the pharmaceutical composition containing abiraterone acetate preferably comprises the following components (consisting of the following components) with the following mass percent by weight:
2 to 20% of abiraterone acetate;
20 to 50% of an oil phase, wherein the oil phase is one or two of hydrogenated castor oil and glyceryl monooleate;

20 to 60% of an emulsifier, wherein the emulsifier is polyoxyethylene castor oil EL35 or polyoxyethylene 40 hydrogenated castor oil; and 20 to 30% of a co-emulsifier, wherein the co-emulsifier is a mixture of ethanol and propylene glycol;

or, 2 to 20% of abiraterone acetate;

20 to 50% of an oil phase, wherein the oil phase is one or two of hydrogenated castor oil and glyceryl monooleate;

20 to 60% of an emulsifier, wherein the emulsifier is one or two of polyoxyethylene castor oil EL35 and Span 80; and 20 to 30% of a co-emulsifier, wherein the co-emulsifier is a mixture of ethanol and propylene glycol;

or, 2 to 20% of abiraterone acetate;

20 to 50% of an oil phase, wherein the oil phase is one or two of glyceryl monolinoleate and medium chain triglyceride;

20 to 70% of an emulsifier, wherein the emulsifier is polyoxyethylene castor oil EL35 or polyoxyethylene 40 hydrogenated castor oil; and 20 to 80% of a co-emulsifier, wherein the co-emulsifier is diethylene glycol monoethyl ether;

or, 2.5 to 10% of abiraterone acetate;

30 to 40% of an oil phase, wherein the oil phase is one or two of glyceryl monolinoleate and medium chain triglyceride;

10 to 30% of an emulsifier, wherein the emulsifier is polyoxyethylene castor oil EL35 or polyoxyethylene 40 hydrogenated castor oil; and 30 to 50% of a co-emulsifier, wherein the co-emulsifier is diethylene glycol monoethyl ether;

or, 2.5 to 6% of abiraterone acetate;

30 to 40% of an oil phase, wherein the oil phase is one or two of glyceryl monolinoleate and medium chain triglyceride;

15 to 20% of an emulsifier, wherein the emulsifier is polyoxyethylene castor oil EL35 or polyoxyethylene 40 hydrogenated castor oil; and 40 to 50% of a co-emulsifier, wherein the co-emulsifier is diethylene glycol monoethyl ether.

In the pharmaceutical composition containing abiraterone acetate according to the present invention, preferably, the excipient can further comprise one or two of an antioxidant and a preservative, wherein the amount of antioxidant or preservative is ranging from 0.005% to 0.3% (preferably 0.005% to 0.1%) of the total mass of the pharmaceutical composition; preferably, the antioxidant is selected from one or two of tert-butyl p-hydroxyanisole (BHA) and butylated hydroxytoluene (BHT).

In a preferred embodiment of the present invention, the pharmaceutical composition containing abiraterone acetate preferably comprises the following components (consisting of the following components) with the following mass percent by weight:

5 to 20% of abiraterone acetate;

20 to 50% of an oil phase, wherein the oil phase is one or two of hydrogenated castor oil and glyceryl monooleate;

20 to 60% of an emulsifier, wherein the emulsifier is one or two of polyoxyethylene castor oil EL35 or polyoxyethylene 40 hydrogenated castor oil;

20 to 30% of a co-emulsifier, wherein the co-emulsifier is ethanol and propylene glycol; and 0.005 to 0.1% of BHA and/or BHT;

or, 5 to 20% of abiraterone acetate;

25 to 40% of an oil phase, wherein the oil phase is one or two of glyceryl monolinoleate and medium chain triglyceride;

25 to 70% of an emulsifier, wherein the emulsifier is polyoxyethylene castor oil EL35 or polyoxyethylene 40 hydrogenated castor oil;

20 to 80% of a co-emulsifier, wherein the co-emulsifier is diethylene glycol monoethyl ether; and 0.005 to 0.1% of BHA and/or BHT;

or, 2 to 20% of abiraterone acetate;

20 to 50% of an oil phase, wherein the oil phase is one or two of hydrogenated castor oil and glyceryl monooleate;

20 to 60% of an emulsifier, wherein the emulsifier is one or two of polyoxyethylene castor oil EL35 and Span 80;

20 to 30% of a co-emulsifier, wherein the co-emulsifier is a mixture of ethanol and propylene glycol; and 0.005-0.1% of BHA and/or BHT;

or, 2.5 to 10% of abiraterone acetate;

30 to 40% of an oil phase, wherein the oil phase is one or two of glyceryl monolinoleate and medium chain triglyceride;

10 to 30% of an emulsifier, wherein the emulsifier is polyoxyethylene castor oil EL35 or polyoxyethylene 40 hydrogenated castor oil; and 30 to 50% of a co-emulsifier, wherein the co-emulsifier is diethylene glycol monoethyl ether; and 0.005-0.1% of BHA and/or BHT.

In a preferred embodiment of the present invention, the pharmaceutical composition containing abiraterone acetate preferably comprises the following components (consisting of the following components) by mass or by volume:

| | |
|---|---|
| abiraterone acetate | 1 to 2 parts by mass |
| hydrogenated castor oil | 3 to 5 parts by volume |
| glyceryl monooleate | 3 to 5 parts by volume |
| polyoxyethylene castor oil EL35 | 6 to 10 parts by volume |
| propylene glycol | 1 to 3 parts by volume |
| ethanol | 2 to 5 parts by volume |
| or, | |
| abiraterone acetate | 3 to 5 parts by mass |
| Span 80 | 5 to 10 parts by volume |
| polyoxyethylene castor oil EL35 | 5 to 10 parts by volume |
| glyceryl monooleate | 5 to 8 parts by volume |
| hydrogenated castor oil | 8 to 12 parts by volume |
| propylene glycol | 3 to 5 parts by volume |
| ethanol | 5 to 10 parts by volume |
| BHA | 0.005 to 0.01 parts by mass |
| BHT | 0.01 to 0.02 parts by mass |
| or, | |
| abiraterone acetate | 1 to 2 parts by mass |
| glyceryl monolinoleate | 3.5 to 5 parts by volume |
| medium chain triglyceride | 2 to 3.5 parts by volume |
| polyoxyethylene 40 hydrogenated castor oil | 2 to 5 parts by volume |
| diethylene glycol monoethyl ether | 3 to 5.5 parts by volume |
| BHA | 0.002 to 0.005 parts by mass |
| BHT | 0.01 to 0.018 parts by mass |

-continued

| or, | |
|---|---|
| abiraterone acetate | 1.1 to 1.8 parts by mass |
| glyceryl monolinoleate | 3 to 5 parts by volume |
| polyoxyethylene 40 hydrogenated castor oil | 3 to 8 parts by volume |
| diethylene glycol monoethyl ether | 6 to 12 parts by volume |
| BHA | 0.002 to 0.0045 parts by mass |
| BHT | 0.01 to 0.015 parts by mass. |

As an explanation and description, in the above-mentioned embodiments, 1 part by weight: 1 part by volume=1 g:1 mL.

In the pharmaceutical composition containing abiraterone acetate according to the present invention, preferably, the active ingredients also comprise prednisone.

The pharmaceutical composition of the invention has an excellent efficacy as a medicament, especially an excellent inhibitory activity on 17α-hydroxylase/C17,20-lyase (CYP17). Since the pharmaceutical composition of the invention can significantly reduce the difference between pre-meal and post-meal administration and improve the oral bioavailability, it can be used in conjunction with prednisone in the treatment of patients with metastatic castration-resistant prostate cancer (CRPC) who ever received with polyene paclitaxel chemotherapy, and can achieve an outstanding efficacy.

The pharmaceutical composition containing abiraterone acetate provided by the present invention can be used alone for treating diseases, for example, diseases including but not limited to prostate cancer. In a specific administrating process, the pharmaceutical composition provided by the present invention can be administered in, for example but not limited to, the following manners.

An adult is administrated at intervals of one day, for example, once a day. Preferably, the effective dose of abiraterone acetate per administration is 25 mg to 200 mg, more preferably 50 mg to 150 mg, and further more preferably 75 mg to 100 mg.

The present invention also provides the use of the pharmaceutical composition in the manufacture of a pharmaceutical preparation, preferably in the manufacture of a pharmaceutical preparation for the treatment of prostate cancer. More preferably, the prostate cancer is selected from one or two of metastatic castration-resistant prostate cancer and high-risk metastatic castration-sensitive prostate cancer.

The present invention further provides a pharmaceutical preparation containing the pharmaceutical composition described in any one of the above. Preferably, the pharmaceutical preparation is a capsule.

The capsule of the invention comprises any one of the above-mentioned pharmaceutical composition containing abiraterone acetate and a capsule shell. The capsule shells are well-known hard capsule and/or soft capsule materials, such as that used in hard gelatin capsules or soft gelatin capsules, which is commercially available or produced and is not specially defined herein.

Each capsule of the capsule of the present invention preferably comprises no more than 100 mg of abiraterone acetate.

The present invention defines that the abiraterone acetate capsules have a single oral dose of 50 to 200 mg of abiraterone acetate.

The present invention further provides a pharmaceutical combination (manner), comprising:
one of the pharmaceutical compositions according to any one of the embodiments described above and the abiraterone acetate capsules according to any one of the embodiments described above, and
prednisone.

The said pharmaceutical combination (manner) of the invention described herein have an administration manner of, including but are not being limited to, using prednisone as one of the active ingredients, sequentially administrating the pharmaceutical compositions or capsules and prednisone, and the like. It can be administrated through common operations in the art.

The present invention further provides the use of the abiraterone acetate capsule according to any one of the embodiments described above, and/or the pharmaceutical combination according to any one of the embodiments in the manufacture of a medicament for the treatment of prostate cancer.

Preferably, the prostate cancer is selected from one or two of metastatic castration-resistant prostate cancer and high-risk metastatic castration-sensitive prostate cancer.

The present invention also provides a method of preparing the pharmaceutical composition containing abiraterone acetate according to any one of the embodiments described above, comprising mixing the oil phase, the emulsifier and the active ingredient, and adding the co-emulsifier (and may further adding antioxidants and/or preservatives).

It will be understood by one skilled in the art that the preparation method can include the steps of mechanical stirring, emulsificating, and sonicating. A preferred embodiment is provided as follows:
stirring the oil phase and the emulsifier at room temperature or under heating condition to form a homogeneous mixture, then adding abiraterone acetate to the mixture and stirring the mixture in dark conditions, and finally adding co-emulsifier and optionally antioxidants and/or preservatives and mixing the mixture well to obtain the pharmaceutical composition.

More specifically, the method comprises the following steps:
stirring the oil phase and the emulsifier at room temperature or under heating condition to form a homogeneous mixture, then adding abiraterone acetate to the mixture, sonicating the mixture for 10 to 20 minutes under dark conditions, mechanically stirring the mixture for 10 to 30 minutes at a speed of 100 to 400 rpm, and finally adding the co-emulsifier and mixing the mixture well to obtain the pharmaceutical composition.

The method for manufacturing the pharmaceutical preparations of the invention may also be operated by one skilled in the art according to conventional methods in the art. A preferred embodiment for preparing capsules is given herein as follows:
preparing the pharmaceutical composition containing abiraterone acetate according to the aforementioned method; sealing the pharmaceutical composition in a soft capsule or a hard capsule. Preferably, each capsule contains 0.5 to 1 ml of the pharmaceutical composition.

In the pharmaceutical composition containing abiraterone acetate provided by the present invention, the concentration of abiraterone acetate can be controlled in the range of 50 to 100 mg/mL and a single oral dose is 75 to 100 mg. The pharmaceutical composition of the invention can spontaneously form an O/W nanoemulsion having a particle size of less than 250 nm with high clarity, uniform particle size and stable properties when mixed with water, biologically related media such as SGF, SGF, FessiF and FassiF media, or gastrointestinal fluid; can exist in the form of a stable solution when stored at room temperature; can possess a stable content even under the conditions of influencing factors (40° C.±2° C., or a relative humidity of 90%).

The difference between pre-meal and post-meal administration of the pharmaceutical composition of the invention is significantly reduced and the oral bioavailability is increased by several to ten times compared to the original drug Zytiga. The pharmaceutical composition can be further manufactured into a capsule, which is stable and the content has a uniform texture.

The present invention further relates to a method of treatment of prostate cancer, comprising administering the aforementioned pharmaceutical composition containing abiraterone acetate or abiraterone acetate capsules. Preferably, a single dose is 25 mg to 200 mg of abiraterone acetate, more preferably 50 mg to 200 mg, still more preferably 50 mg to 150 mg, further preferably 75 mg to 100 mg. Preferably, the pharmaceutical composition or capsule can be administered before or after meal. Preferably, the prostate cancer is selected from one or two of metastatic castration-resistant prostate cancer and high-risk metastatic castration-sensitive prostate cancer.

BRIEF DESCRIPTION OF THE DRAWINGS

In order to explain the embodiments of the present invention or the prior art more clearly, the drawings that need to be used in the description of the embodiments or the prior art will be introduced briefly in the following. It is obvious that the drawings in the following description are merely part of the embodiments of the present invention. For one skilled in the art, other drawings can be obtained based on these drawings without creative efforts.

DETAILED DESCRIPTION OF THE INVENTION

Figure 1:
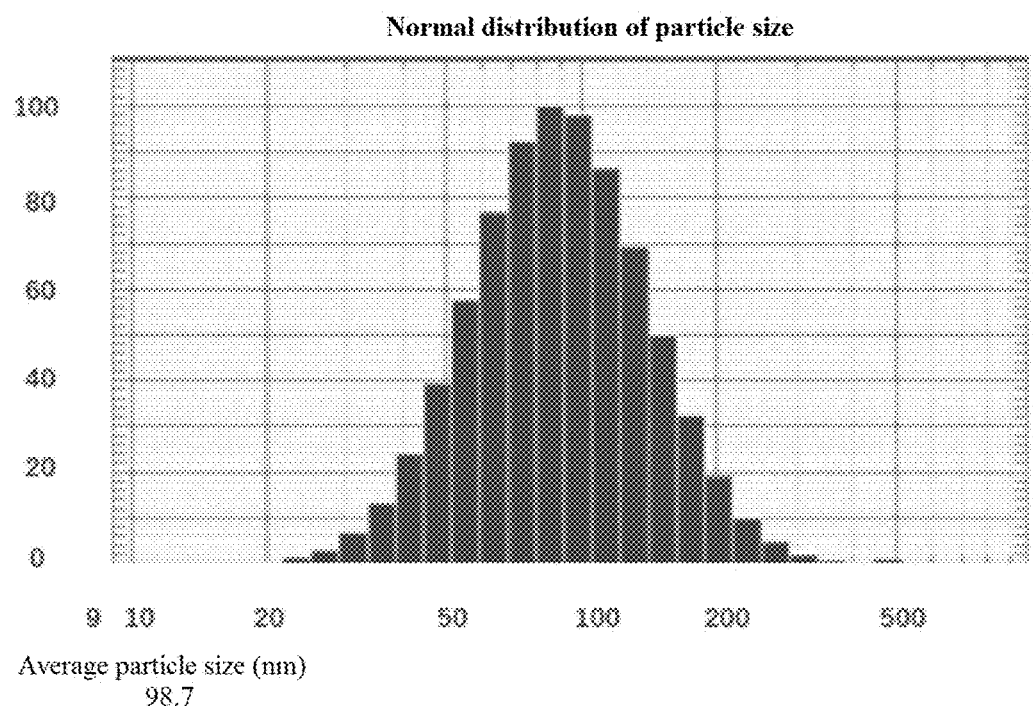
FIG. 1 is a particle size distribution diagram after the content of the abiraterone acetate capsule in Example 1 forming microemulsions in water.

The technical solutions in the examples of the present invention will be clearly and completely described below in conjunction with the accompanied drawings of the examples of the present invention. Obviously, the described examples are merely a part of the examples rather than all the examples of the present invention. Based on the examples of the present invention, all other examples obtained by one skilled in the art without creative effects fall within the scope of the present invention.

Example 1

This example provided a pharmaceutical composition containing abiraterone acetate comprising the following components:

| | |
|---|---|
| abiraterone acetate | 1.65 g |
| hydrogenated castor oil | 4.0 mL |
| glyceryl monooleate | 4.0 mL |
| polyoxyethylene castor oil EL35 | 8.0 mL |
| propylene glycol | 2.0 mL |
| ethanol | 4.0 mL |

This example further provided an abiraterone acetate capsule, which used the above-mentioned pharmaceutical composition as the content, and the content was filled in a capsule shell.

The preparation method was provided as follows.

Hydrogenated castor oil, glyceryl monooleate, and polyoxyethylene castor oil EL35 were measured out, and then abiraterone acetate was added to form a mixture. The mixture was sonicated for 10 minutes under dark conditions and was stirred mechanically at 300 rpm for 20 minutes to allow it completely dissolved. Thereafter, propylene glycol and ethanol were added until it became a transparent and homogeneous self-emulsifying solution, which was filled in soft capsules or sealed in hard capsules under nitrogen atmosphere and stored.

Example 2

This example provided a pharmaceutical composition containing abiraterone acetate comprising the following components:

| | |
|---|---|
| abiraterone acetate | 4.00 g |
| Span 80 | 9.0 mL |
| polyoxyethylene castor oil EL35 | 7.0 mL |
| glyceryl monooleate | 7.0 mL |
| hydrogenated castor oil | 9.0 mL |
| propylene glycol | 4.0 mL |
| ethanol | 8.0 mL |
| BHA | 0.009 g |
| BHT | 0.014 g |

This example further provided an abiraterone acetate capsule, which used the above-mentioned pharmaceutical composition as the content, and the content was filled in a capsule shell.

The preparation method was provided as follows.

Span 80, hydrogenated castor oil, glyceryl monooleate, and polyoxyethylene castor oil EL35 were measured out, and then abiraterone acetate was added to form a mixture. The mixture was stirred mechanically at 300 rpm for 25 minutes to allow it completely dissolved. Thereafter, BHA, BHT, propylene glycol and ethanol were added until it became a transparent and homogeneous self-emulsifying solution, which was filled in soft capsules or sealed in hard capsules under nitrogen atmosphere and stored.

Example 3

This example provided a pharmaceutical composition containing abiraterone acetate comprising the following components:

| | |
|---|---|
| abiraterone acetate | 1.17 g |
| glyceryl monolinoleate | 4.4 mL |
| medium chain triglyceride | 2.8 mL |
| polyoxyethylene 40 hydrogenated castor oil | 3.6 mL |
| diethylene glycol monoethyl ether | 4.8 mL |
| BHA | 0.004 g |
| BHT | 0.012 g |

This example further provided an abiraterone acetate capsule, which used the above-mentioned pharmaceutical composition as the content, and the content was filled in a capsule shell.

The preparation method was provided as follows.

Medium chain triglyceride, glyceryl monolinoleate, and polyoxyethylene 40 hydrogenated castor oil were measured out, and then abiraterone acetate was added to form a mixture. The mixture was stirred mechanically at 300 rpm for 30 minutes to allow it completely dissolved. Thereafter, diethylene glycol monoethyl ether, BHT, and BHA were added until it became a transparent and homogeneous self-emulsifying solution, which was filled in soft capsules or sealed in hard capsules under nitrogen atmosphere and stored.

Example 4

This example provided a pharmaceutical composition containing abiraterone acetate comprising the following components:

| | |
|---|---|
| abiraterone acetate | 1.47 g |
| glyceryl monolinoleate | 4.4 mL |
| polyoxyethylene 40 hydrogenated castor oil | 3.6 mL |
| diethylene glycol monoethyl ether | 7.6 mL |
| BHA | 0.004 g |
| BHT | 0.012 g |

This example further provided an abiraterone acetate capsule, which used the above-mentioned pharmaceutical composition as the content, and the content was filled in a capsule shell.

The preparation method was provided as follows.

Glyceryl monolinoleate, and polyoxyethylene 40 hydrogenated castor oil were measured out, and then abiraterone acetate was added to form a mixture. The mixture was stirred mechanically at 300 rpm for 30 minutes to allow it completely dissolved. Thereafter, diethylene glycol monoethyl ether, BHT, and BHA were added until it became a transparent and homogeneous self-emulsifying solution, which was filled in soft capsules or sealed in hard capsules under nitrogen atmosphere and stored.

Example 5

This example provided a pharmaceutical composition containing abiraterone acetate comprising the following components:

| | |
|---|---|
| abiraterone acetate | 1.32 g |
| glyceryl monolinoleate | 5.6 mL |
| medium chain triglyceride | 2.8 mL |
| polyoxyethylene 40 hydrogenated castor oil | 4.8 mL |
| propylene glycol | 2.8 mL |
| ethanol | 1.6 mL |
| BHA | 0.004 g |
| BHT | 0.009 g |

This example further provided an abiraterone acetate capsule, which used the above-mentioned pharmaceutical composition as the content, and the content was filled in a capsule shell.

The preparation method was provided as follows.

Medium chain triglyceride, glyceryl monolinoleate, and polyoxyethylene 40 hydrogenated castor oil were measured out, and then abiraterone acetate was added to form a mixture. The mixture was stirred mechanically at 300 rpm for 30 minutes to allow it completely dissolved. Thereafter, ethanol, propylene glycol, BHT, and BHA were added until it became a transparent and homogeneous self-emulsifying solution, which was filled in soft capsules or sealed in hard capsules under nitrogen atmosphere and stored.

Example 6

This example provided a pharmaceutical composition containing abiraterone acetate comprising the following components:

| | |
|---|---|
| abiraterone acetate | 2.2 g |
| Tween 80 | 5.0 mL |
| polyoxyethylene 40 hydrogenated castor oil | 8.0 mL |
| glyceryl monooleate | 9.0 mL |
| corn oil | 10.0 mL |
| propylene glycol | 4.0 mL |
| ethanol | 8.0 mL |

This example further provided an abiraterone acetate capsule, which used the above-mentioned pharmaceutical composition as the content, and the content was filled in a capsule shell.

The preparation method was also provided as follows. Tween 80, corn oil, glyceryl monooleate, and polyoxyethylene 40 hydrogenated castor oil were measured out, and then abiraterone acetate was weighed and added to allow it fully mixed. Thereafter, propylene glycol and ethanol were added, and a transparent and homogeneous solution was obtained under heating under water bath. After the solution was cooled down to room temperature, the homogeneous phase was destroyed and the drug was crystallized out.

Example 7

This example provided a pharmaceutical composition containing abiraterone acetate comprising the following components:

| | |
|---|---|
| abiraterone acetate | 4.40 g |
| Tween 80 | 3.0 mL |
| polyoxyethylene castor oil EL35 | 5.0 mL |
| polyoxyethylene 40 hydrogenated castor oil | 8.0 mL |
| glyceryl monooleate | 8.0 mL |
| hydrogenated castor oil | 8.0 mL |
| propylene glycol | 2.0 mL |
| ethanol | 10.0 mL |

This example further provided an abiraterone acetate capsule, which used the above-mentioned pharmaceutical composition as the content, and the content was filled in a capsule shell.

The preparation method was also provided as follows. Tween 80, polyoxyethylene 40 hydrogenated castor oil, hydrogenated castor oil, glyceryl monooleate, and polyoxyethylene castor oil EL35 were measured out, and then abiraterone acetate was added to allow it completely dissolved. Thereafter, propylene glycol and ethanol were added until it became a transparent and homogeneous self-emulsifying solution, which was filled in soft capsules or sealed in hard capsules under nitrogen atmosphere and stored.

Example 8

This example provided a pharmaceutical composition containing abiraterone acetate comprising the following components:

| | |
|---|---|
| abiraterone acetate | 4.40 g |
| Span 80 | 8.4 mL |
| Solutol | 2.6 mL |
| polyoxyethylene castor oil EL35 | 5.0 mL |
| glyceryl monooleate | 8.0 mL |
| hydrogenated castor oil | 8.0 mL |
| propylene glycol | 2.0 mL |
| ethanol | 10.0 mL |

This example further provided an abiraterone acetate capsule, which used the above-mentioned pharmaceutical composition as the content, and the content was filled in a capsule shell.

The preparation method was also provided. Span 80, Solutol, hydrogenated castor oil, glyceryl monooleate, and polyoxyethylene castor oil EL35 were measured out, and then abiraterone acetate was added to allow it completely dissolved. Thereafter, propylene glycol and ethanol were added until it became a transparent and homogeneous self-emulsifying solution, which was filled in soft capsules or sealed in hard capsules under nitrogen atmosphere and stored.

Example 9

This example provided a pharmaceutical composition containing abiraterone acetate comprising the following components:

| | |
|---|---|
| abiraterone acetate | 4.40 g |
| Span 80 | 8.8 mL |
| polyoxyethylene castor oil EL35 | 4.4 mL |
| glyceryl monooleate | 8.0 mL |
| hydrogenated castor oil | 9.6 mL |
| propylene glycol | 4.4 mL |
| ethanol | 8.8 mL |

This example further provided an abiraterone acetate capsule, which used the above-mentioned pharmaceutical composition as the content, and the content was filled in a capsule shell.

The preparation method was also provided. Span 80, hydrogenated castor oil, glyceryl monooleate, and polyoxyethylene castor oil EL35 were measured out, and then abiraterone acetate was added to allow it completely dissolved. Thereafter, propylene glycol and ethanol were added until it became a transparent and homogeneous self-emulsifying solution, which was filled in soft capsules or sealed in hard capsules under nitrogen atmosphere and stored.

Example 10

Same with Example 1, with the exceptions that 2.0 mL propylene glycol and 4.0 mL ethanol were replaced with 1.0 mL propylene glycol and 2.0 mL ethanol, respectively.

Example 11

Same with Example 3, with the exceptions that 4.8 mL diethylene glycol monoethyl ether was replaced with 1.6 mL diethylene glycol monoethyl ether.

Example 12

Same with Example 3, with the exceptions that 4.8 mL diethylene glycol monoethyl ether was replaced with 17.6 mL diethylene glycol monoethyl ether.

Example 13

Same with Example 3, with the exceptions that 4.8 mL diethylene glycol monoethyl ether was replaced with 36.8 mL diethylene glycol monoethyl ether.

Example 14

This example provided a pharmaceutical composition containing abiraterone acetate comprising the following components:

| | |
|---|---|
| abiraterone acetate | 50 mg |
| glyceryl monolinoleate | 286.5 mg |
| medium chain triglyceride | 84.89 mg |
| polyoxyethylene 40 hydrogenated castor oil | 212.22 mg |
| diethylene glycol monoethyl ether | 477.5 mg |

Test Example 1

This Test example provided the dissolution test of abiraterone acetate capsules provided in Example 1-4 and original drug Zytiga tablet.

Test method: in accordance with the dissolution test method for abiraterone acetate from the "United States Pharmacopoeia (USP)", the dissolution tests of abiraterone acetate capsules (prepared in Examples 1, 2, 3) and the original drug Zytiga tablet were carried out in 900 mL release medium 1 under 50 rpm at 37° C., respectively.

Among them, a phosphate buffer solution with a pH of 4.5 was prepared by the following method: adding 56.5 mM sodium dihydrogen phosphate to water, and adjusting the pH was to 4.5 with sodium hydroxide or phosphoric acid.

The specific method was as follows:

| | |
|---|---|
| Dissolution conditions | Medium 1: 900 ml phosphate buffer solution containing 0.25% sodium lauryl sulfate with pH 4.5 (USP condition) Medium 2: 900 ml water Rotation speed: 50 r/min Time: 45 min |
| Test methods | UV-visible spectrophotometer |
| Test preparations | Commercial preparation: Trade name (Zytiga) Specification: 250 mg tablet Preparation of the present invention: abiraterone acetate capsules of Examples 1, 2, 3 and 4 |
| Test results | Dissolution test results: see Tables 1 and Table 2 |

TABLE 1

Dissolution of abiraterone acetate capsule and Zytiga tablet in medium 1 (%)

| Sampling point/min | Zytiga | Example 1 | Example 2 | Example 3 | Example 4 |
|---|---|---|---|---|---|
| 5 | 22 | 73 | 80 | 74 | 75 |
| 10 | 42 | 93 | 97 | 91 | 90 |
| 15 | 64 | 96 | 99 | 97 | 96 |
| 20 | 71 | 98 | 99 | 99 | 97 |
| 30 | 89 | 99 | 97 | 99 | 99 |
| 45 | 91 | 98 | 99 | 99 | 99 |

TABLE 2

Dissolution of abiraterone acetate capsule and Zytiga tablet in medium 2 (%)

| Sampling point/min | Zytiga | Example 1 | Example 2 | Example 3 | Example 4 |
|---|---|---|---|---|---|
| 5 | 0 | 86 | 72 | 70 | 75 |
| 10 | 0 | 95 | 84 | 84 | 82 |
| 15 | 1 | 99 | 92 | 90 | 97 |
| 20 | 1 | 98 | 96 | 94 | 96 |
| 30 | 2 | 99 | 97 | 99 | 97 |
| 45 | 2 | 97 | 99 | 99 | 99 |

The comparison results of Tables 1 and 2 showed that the abiraterone acetate capsules of the present invention (Examples 1, 2, 3, and 4) were substantially dissolved completely in medium 1 within 15 minutes, but the commercial abiraterone acetate tablet Zytiga was unable to be completely dissolved until 45 minute. The abiraterone acetate capsules of the present invention (Examples 1, 2, 3, and 4) were substantially dissolved completely in medium 2, but the commercial abiraterone acetate tablet Zytiga had an extremely low dissolution.

It can be seen from the experimental results described above that the abiraterone acetate capsule of the present invention is capable of effectively improving the dissolution of abiraterone acetate under both USP and non-UPS conditions, which facilitates to increase the oral bioavailability of abiraterone acetate and reduce individual differences.

Test Example 2

This Test example provided the stability test of the abiraterone acetate capsule provided by Examples 1-9.

(1) Long-term test: the abiraterone acetate capsule was charged into a polyethylene plastic bottle, and the sample was placed under a relative humidity of 60%±10% at a temperature of 25° C.±2° C. to observe the physical stability of the pharmaceutical composition inside the capsule. The test results were shown in Table 3.

TABLE 3

Physical stability of the pharmaceutical composition

| Stability test | 1 month | 2 months | 3 months | 6 months |
|---|---|---|---|---|
| Example 1 | − | − | − | − |
| Example 2 | − | − | − | − |
| Example 3 | − | − | − | − |
| Example 4 | − | − | − | − |
| Example 5 | − | − | − | − |
| Example 6 | + | ++ | ++ | ++ |
| Example 7 | − | ++ | ++ | ++ |
| Example 8 | − | − | − | − |
| Example 9 | − | − | − | − |
| Example 10 | + | ++ | +++ | +++ |
| Example 11 | + | ++ | +++ | +++ |
| Example 12 | − | − | − | − |
| Example 13 | − | − | − | − |
| Example 14 | − | − | − | − |

−: Clear solution, no drug precipitation
+: Clear solution, trace amount of drug precipitation
++: Clear solution, small amount of drug precipitation
+++: Clear solution, substantial amount of drug precipitation It can be seen from Table 3 that the pharmaceutical composition formed by the specific emulsifier, oil phase, co-emulsifier and abiraterone acetate of the present invention has good physical stability. Particularly, the combination of 20% to 80% (percent by mass relative to the total mass of the composition) of specific co-emulsifiers and specific emulsifiers (polyoxyethylene castor oil EL35, polyoxyethylene 40 hydrogenated castor oil, Span 80, polyethylene glycol-15 hydroxystearate) achieves a significantly better physical stability. In addition, taking the factors such as drug safety, chemical stability, preparation production and so on into consideration, the percent of the co-emulsifier is preferably 60% or less by mass, particularly 20% to 60%.

(2) Accelerated test: the abiraterone acetate capsule was charged into a polyethylene plastic bottle, and then the sample was placed under a relative humidity of 60%±10% at a temperature of 40° C.±2° C. to test the content and related substances of the pharmaceutical composition. The results were shown in Table 4. The abiraterone acetate capsules prepared in Examples 1, 2, 3, and 4 possess stable content.

TABLE 4

Accelerated stability of the pharmaceutical composition

| | | 0 month | 1 month | 3 months |
|---|---|---|---|---|
| Example 1 | Traits | Light yellow transparent liquid | Light yellow transparent liquid | Light yellow transparent liquid |
| | Content | 99.9% | 99.8% | 99.2% |
| | Total impurities | 0.05% | 0.21% | 0.78% |
| | Dissolution | passed | passed | passed |

TABLE 4-continued

Accelerated stability of the pharmaceutical composition

| | | 0 month | 1 month | 3 months |
|---|---|---|---|---|
| Example 2 | Traits | Light yellow transparent liquid | Light yellow transparent liquid | Light yellow transparent liquid |
| | Content | 99.9% | 99.8% | 99.7% |
| | Related substances | 0.05% | 0.15% | 0.26% |
| | Dissolution | passed | passed | passed |
| Example 3 | Traits | Light yellow transparent liquid | Light yellow transparent liquid | Light yellow transparent liquid |
| | Content | 99.9% | 99.9% | 99.3% |
| | Related substances | 0.05% | 0.11% | 0.69% |
| | Dissolution | passed | passed | passed |
| Example 4 | Traits | Light yellow transparent liquid | Light yellow transparent liquid | Light yellow transparent liquid |
| | Content | 99.9% | 99.9% | 99.4% |
| | Related substances | 0.05% | 0.11% | 0.57% |
| | Dissolution | passed | passed | passed |

Test Example 3

This Test example provided the self-emulsification ability and particle size test of the pharmaceutical compositions provided by Examples 1 to 9.

The pharmaceutical compositions prepared in Examples 1-9 were added to purified water, and the appearance and traits were observed after slight shaking. The particle size of the formed emulsion was measured with a nanoparticle size meter. Results is shown in Tables 5-1.

TABLE 5-1

Traits and particle size after emulsification of the pharmaceutical composition

| | Traits | Nanoemulsion particle size |
|---|---|---|
| Example 1 | Clear and transparent nanoemulsion | about 100 nm |
| Example 2 | Clear and transparent slightly blue opalescent nanoemulsion | about 110 nm |
| Example 3 | Clear and transparent slightly blue opalescent nanoemulsion | about 70 nm |
| Example 4 | Clear and transparent slightly blue opalescent nanoemulsion | about 90 nm |
| Example 5 | Clear and transparent slightly blue opalescent nanoemulsion | about 90 nm |
| Example 6 | Unable to form a homogeneous system, oil droplets always exist | Not tested |
| Example 7 | Opalescent nanoemulsion | Not tested |
| Example 8 | Clear and transparent light blue opalescent nanoemulsion | about 270 nm |
| Example 9 | Clear and transparent light blue opalescent nanoemulsion | about 140 nm |

This Test example also provided the stability test of the obtained nanoemulsion after emulsifying the pharmaceutical compositions of Examples 1 to 9. The test method was as follows.

Long-term test: the samples were placed under a relative humidity of 60%±10% at a temperature of 25° C.±2° C. and the stability of the nanoemulsion after emulsification of the pharmaceutical composition was observed. The results were shown in Table 5-2.

TABLE 5-2

Nanoemulsion traits after emulsification of the pharmaceutical composition

| | 0 h | 2 weeks | 4 weeks |
|---|---|---|---|
| Example 1 | Clear and transparent nanoemulsion | — | — |
| Example 2 | Clear and transparent slightly blue opalescent nanoemulsion | — | — |
| Example 3 | Clear and transparent slightly blue opalescent nanoemulsion | — | — |
| Example 4 | Clear and transparent slightly blue opalescent nanoemulsion | — | — |
| Example 8 | Clear and transparent light blue opalescent nanoemulsion | — | — |
| Example 9 | Clear and transparent light blue opalescent nanoemulsion | — | — |

— Represents no difference

Figure 2:
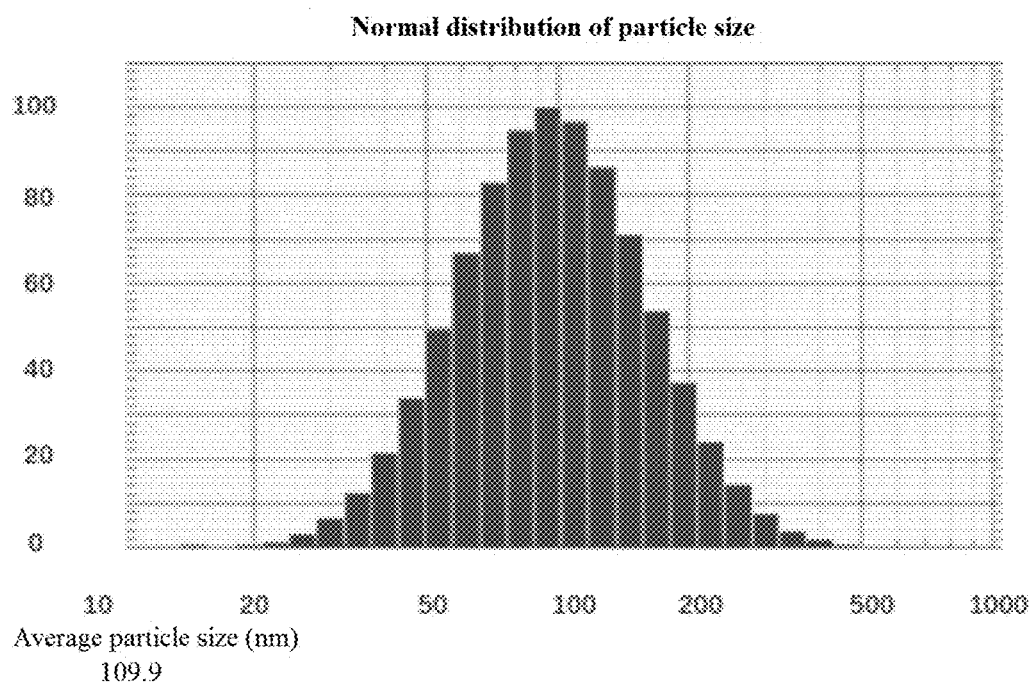
FIG. 2 is a particle size distribution diagram after the content of the abiraterone acetate capsule in Example 2 forming microemulsions in water.
Figure 3:
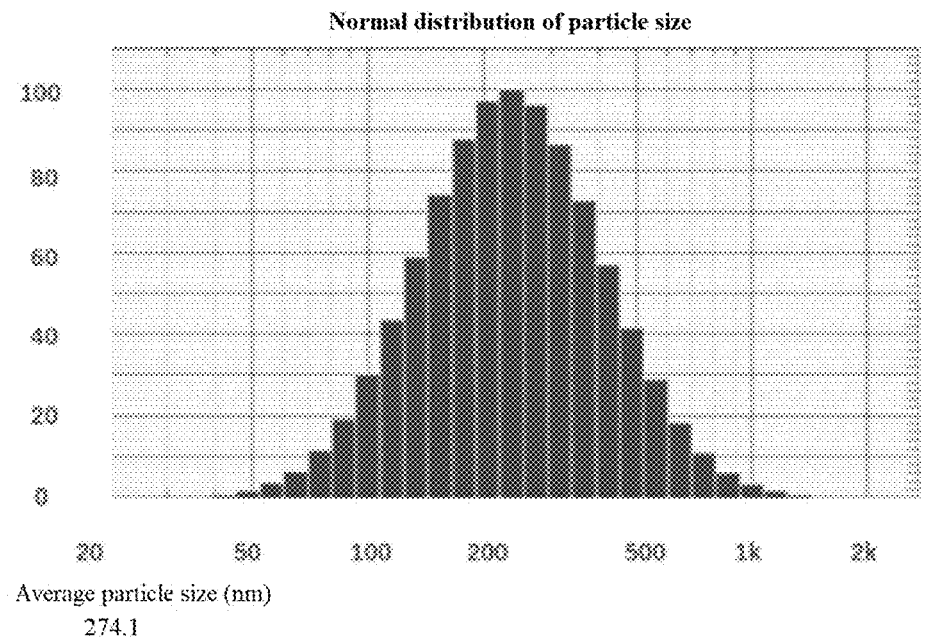
FIG. 3 is a particle size distribution diagram after the content of the abiraterone acetate capsule in Example 8 forming microemulsions in water.

See the attached drawings. FIG. 1 is the particle size distribution diagram of the microemulsion formed by the content of abiraterone acetate capsule in Example 1 in water, FIG. 2 is the particle size distribution diagram of the microemulsion formed by the content of abiraterone acetate capsule in Example 2 in water, and FIG. 3 is the particle size distribution diagram of the microemulsion formed by the content of abiraterone acetate capsule in Example 8 in water.

Test Example 4

This Test example provided the pharmacokinetic test of Example 1, Example 14 and the original drug Zytiga of abiraterone acetate.

Test method and subject:

Healthy beagle dogs were randomly divided into 3 groups, 2 in each group, and the washout period is 3 days between cycles. The test groups were shown in Table 6.

The tests were divided into fasting test and postprandial test.

Fasting test: fasting the subject for 10 h before the test, administrating the drug on an empty stomach, and feeding 4 hours after the administration.

Postprandial test: fasting the subject for 10 h before the test, and administering after feeding a high-fat meal (feeding and administration were completed within 30 minutes).

The tested tablet was the original drug Zytiga of abiraterone acetate, and a single tablet contained 250 mg of abiraterone acetate.

The tested capsule I was the abiraterone acetate capsule provided by Example 1, and a single capsule contained 50 mg of abiraterone acetate.

The tested capsule II was the abiraterone acetate capsule provided by Example 14, and a single capsule contained 50 mg of abiraterone acetate.

Sampling design: collecting 2 mL blood sample at 15 minutes, 30 minutes, 1 h, 1.5 h, 2.0 h, 2.5 h, 3 h, 4 h, 6 h, 8 h, 10 h, 12 h, and 24 h after administration, and centrifuging the sample to separate plasma.

TABLE 6

| Test group | First cycle | Second cycle | Third cycle | Fourth cycle | Fifth cycle |
|---|---|---|---|---|---|
| | Test grouping | | | | |
| 1 | fasting, 2 tablets (T1) | postprandial, 1 capsule I (T3) | fasting, 1 capsule I (T2) | fasting, 1 capsule II (T4) | postprandial, 1 capsule II (T5) |
| 2 | fasting, 1 capsule I (T2) | fasting, 2 tablets (T1) | postprandial, 1 capsule I (T3) | fasting, 1 capsule II (T4) | postprandial, 1 capsule II (T5) |
| 3 | postprandial, 1 capsule I (T3) | fasting, 1 capsule I (T2) | fasting, 2 tablets (T1) | fasting, 1 capsule II (T4) | postprandial, 1 capsule II (T5) |

Figure 4:
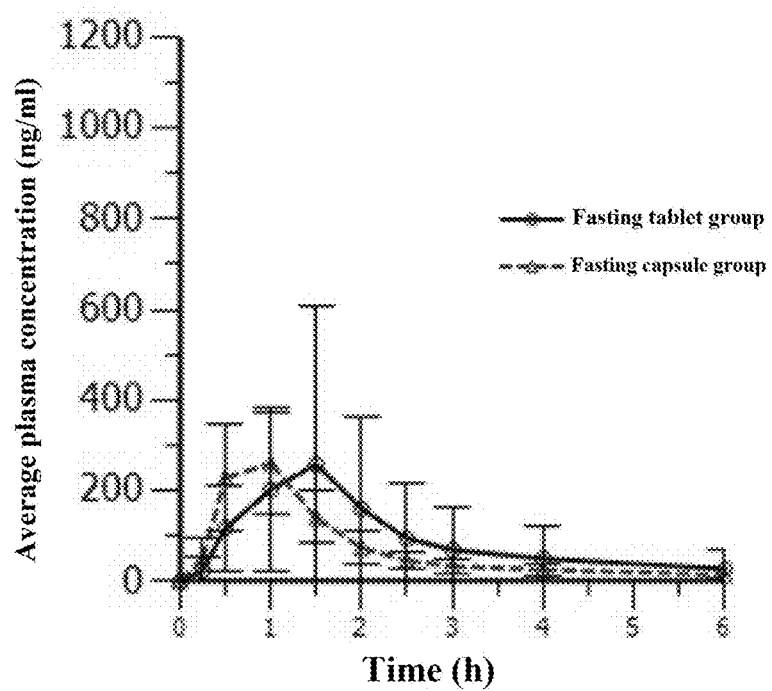
FIG. 4 is a drug-time curve chart of the fasting test for tablet and capsule in Test Example 4.
Figure 5:
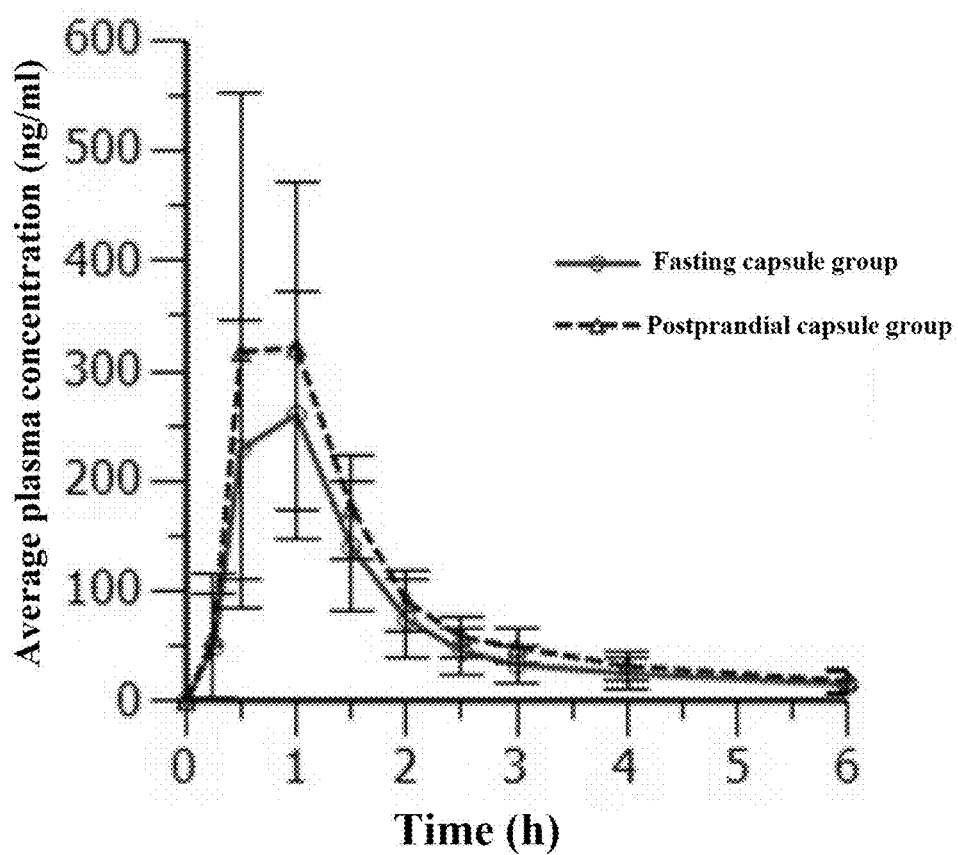
FIG. 5 is a drug-time curve chart of the fasting and postprandial test for capsule in Test Example 4.

In the table, T1 represents a group with fasting test-the original drug Zytiga (labeled as fasting tablet group in FIG. 4), T2 represents a group with fasting test-abiraterone acetate capsule of Example 1 (labeled as fasting capsule group in FIG. 4 and FIG. 5), and T3 represents a group with postprandial test-abiraterone acetate capsule (labeled as a postprandial capsule group in FIG. 5); T4 represents a group with fasting test-abiraterone acetate capsule of Example 14; T5 represents a group with postprandial test-abiraterone acetate capsule of Example 14.

TABLE 7

Fasting test: pharmacokinetic parameters for 500 mg of the original drug Zytiga vs. 50 mg of the abiraterone acetate capsule

| | Tablet (T1) | | | | Capsule (T2) | | | | Capsule (T4) | | | |
|---|---|---|---|---|---|---|---|---|---|---|---|---|
| Items | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) |
| Average value | 2.11 | 0.96 | 316.65 | 563.09 | 8.34 | 0.83 | 275.94 | 553.29 | 8.44 | 0.67 | 383.15 | 756.39 |
| Standard deviation | 0.48 | 0.51 | 316.04 | 666.00 | 2.80 | 0.26 | 107.63 | 244.76 | 0.56 | 0.22 | 175.75 | 204.19 |
| Variable coefficient % | 22.88 | 53.25 | 99.81 | 118.27 | 33.57 | 30.98 | 39.00 | 44.24 | 26.52 | 32.48 | 45.87 | 28.11 |

In the table, $T_{1/2}$ represents the drug half-life, $T_{max}$ represents the peak time, $C_{max}$ represents the maximum plasma concentration (peak concentration), and $AUC_{last}$ represents the AUC (area under the drug-time curve) during the duration from the start of administration to the last point.

The results were shown in FIG. 4, which was the drug-time curve on 50 mg of abiraterone acetate capsule (T2) of Example 1 and 500 mg of original drug Zytiga (T1) for beagle dogs on an empty stomach in the fasting test.

It can be seen from Table 7 that the oral bioavailability of one abiraterone acetate capsule of Example 1 (containing 50 mg of abiraterone acetate) for beagle dogs on an empty stomach reached 98% compared to two tablets of the original drug Zytiga (250 mg/tablet). The oral bioavailability of one abiraterone acetate capsule of Example 14 (containing 50 mg of abiraterone acetate) for beagle dogs on an empty stomach reached 134% compared to two tablets of the original drug Zytiga (250 mg/tablet). It demonstrated that the oral bioavailability of the abiraterone acetate pharmaceutical composition of the present invention was 10 to 13 times of the original drug Zytiga (250 mg/tablet), and the variable coefficient of peak time, peak concentration and absorption level among individuals were significantly lower than that of the original drug Zytiga.

TABLE 8

Postprandial test: Pharmacokinetic parameters of 50 mg of the abiraterone acetate capsule pre-meal and post-meal

| | Capsule (T2) | | | | Capsule (T3) | | | | Capsule (T5) | | | |
|---|---|---|---|---|---|---|---|---|---|---|---|---|
| Items | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) |
| Average value | 8.34 | 0.83 | 275.94 | 553.29 | 6.67 | 0.83 | 376.78 | 669.20 | 6.68 | 1.0 | 497.35 | 857.14 |
| Standard deviation | 2.80 | 0.26 | 107.63 | 244.76 | 2.87 | 0.41 | 184.98 | 259.75 | 0.39 | 0.35 | 158.28 | 232.38 |

TABLE 8-continued

Postprandial test: Pharmacokinetic parameters of 50 mg of the abiraterone acetate capsule pre-meal and post-meal

| | Capsule (T2) | | | | Capsule (T3) | | | | Capsule (T5) | | | |
|---|---|---|---|---|---|---|---|---|---|---|---|---|
| Items | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) | $T_{1/2}$ (h) | $T_{max}$ (h) | $C_{max}$ (ng/mL) | $AUC_{last}$ (h*ng/mL) |
| Variable coefficient % | 33.57 | 30.98 | 39.00 | 44.24 | 43.11 | 48.99 | 49.10 | 38.81 | 23.23 | 35.36 | 31.82 | 27.11 |

In the table, $T_{1/2}$ represents the drug half-life, $T_{max}$ represents the peak time, $C_{max}$ represents the maximum plasma concentration (peak concentration), and $AUC_{last}$ represents the AUC (area under the drug-time curve) during the duration from the start of administration to the last point.

The results were shown in FIG. 5, which was the drug-time curve on 50 mg of abiraterone acetate capsule of Example 1 taken by beagle dogs pre-meal (T2) and post-meal (T3) in the postprandial test.

It can be seen from Table 8 that after beagle dogs taking abiraterone acetate capsules of Example 1 (containing 50 mg of abiraterone acetate) on an empty stomach and after a high-fat meal, there was no significant difference in the peak time, and the post-meal oral bioavailability was only 1.2 times of that of pre-meal. After beagle dogs taking abiraterone acetate capsules of Example 14 (containing 50 mg of abiraterone acetate) on an empty stomach and after a high-fat meal, there was no significant difference in the peak time, and the post-meal oral bioavailability was only 1.13 times of that of pre-meal.

The abiraterone acetate capsule provided by the present invention is capable of reducing the difference between pre-meal and post-meal administration, as compared to the high-fat postprandial peak concentration and absorption value of Zytiga being 17 times and 10 times of those under the fasting state as recited in the specification of the original drug Zytiga.

Test Example 5

1. This Test example provided the issue distribution of abiraterone acetate capsules.
1.1 Administration 27 male rats were randomly divided into 3 groups with 9 rats in each group. The specific administration method was as follows:

9 male rats in Group 1 (F01-F09) were orally administrated the original drug Zytiga with a dose of 500 mg; 18 male rats in Groups 2-3 (F10-F27) were orally administrated abiraterone acetate capsule of the present application (Example 1 and Example 14) with a dose of 50 mg.
1.2 Sample Collection and Processing 3 male rats of the group administrated with the original drug Zytiga were sacrificed at each of the timing at 0.5 h, 2 h and 4 h post intragastric administration, and 3 male rats of the group administrated with the abiraterone acetate capsule were sacrificed at each of the timing at 0.5 h, 2 h and 4 h post intragastric administration. 0.5 ml of venous blood was collected, and then the rats were dissected immediately to take out the heart, liver, spleen, lung, kidney, stomach, intestine, sputum, brain, spine, spinal fluid, nerve, thymus, lymph node, arterial wall, pancreas, gallbladder, prostate, testis, thyroid, adrenal gland, hypothalamus, pituitary gland, eyes, ears, bladder, muscle, skin, leukocytes, bone, cartilage, joint tissue, synovial fluid and adipose tissue, etc. The taken out tissues were washed with normal saline to remove blood stains, then dried with filter paper and weighed. In addition, fecal samples from male rat intestines were collected and weighed to determine the amount of unabsorbed drugs.

The collected blood samples were anticoagulated with heparin sodium. Within 1 h after collection, they were centrifuged at 3500 rpm at 2-8° C. for 10 minutes. The separated plasma was stored in a −80° C. refrigerator for testing. Lymphocytes and lower red blood cells were also recovered and stored in a −80° C. refrigerator for testing.

A certain amount (about 0.2 g) of each tissue sample was taken, added with 3 ml normal saline per gram of tissue, stirred with an electric homogenizer under an ice bath until it was fully homogenized, and stored in a refrigerator at −80° C. for testing. The remaining tissues that were not homogenized were recovered and stored in a −80° C. refrigerator.

The whole process of sample collection and processing was kept away from light.
1.3 Sample Testing The concentrations of abiraterone acetate in a male rat plasma sample, a tissue sample comprising testis sample and prostate sample, and a fecal sample were detected by LC-MS/MS. The results are shown in Table 9 and Table 10 below.

TABLE 9

| | | Ratio of abiraterone acetate concentration in tissue sample to plasma sample | | |
|---|---|---|---|---|
| | Drugs | 0.5 h | 2 h | 4 h |
| Ratio of abiraterone acetate concentration in testis sample to plasma sample | Original drug Zytiga | 0.0468 | 0.1161 | 0.6621 |
| | Example 1 | 0.0556 | 0.2518 | 1.5456 |
| | Example 14 | 0.1342 | 0.6792 | 2.3424 |
| Ratio of abiraterone acetate concentration in prostate sample to plasma sample | Original drug Zytiga | 0.08799 | 3.5926 | 6.4445 |
| | Example 1 | 0.3779 | 10.2045 | 15.4813 |
| | Example 14 | 2.7474 | 16.5699 | 17.2236 |

TABLE 10

| Abiraterone acetate concentration in fecal sample | |
|---|---|
| Drugs | 4 h |
| Original drug Zytiga | 13430 |
| Example 1 | 163.1 |
| Example 14 | 50.7 |

As shown in Table 9, the result showed that the abiraterone acetate capsules (Example 1 and Example 14) of the present application have high drug concentrations in the testis and prostate compared with the abiraterone acetate concentration in the plasma sample. This result showed that abiraterone acetate accumulates in the testis and prostate, and has a high concentration in specific local tissues, which is beneficial to entering the target location and can produce better efficacy. As shown in Table 10, after 4 hours post administration, the concentration of abiraterone acetate in equal weight feces of rats administered the abiraterone acetate composition of the Examples of the present invention were significantly lower than that of those administrated the reference drug, indicating a better abiraterone acetate absorbability over the reference drug.

Although the present invention has been described elaborately through the general description, specific embodiments and tests, it is obvious for one skilled in the art to make some modifications or improvements on the basis of the present invention. Therefore, these modifications or improvements made without departing from the spirit of the present invention belong to the scope of the present invention.

The invention claimed is:

1. A pharmaceutical composition containing abiraterone acetate, wherein the pharmaceutical composition has an oral bioavailability of ten times or more compared to original drug abiraterone acetate; and based on the total mass of the pharmaceutical composition, the pharmaceutical composition comprises the following components by weight:
    2 to 20% abiraterone acetate;
    20 to 50% of an oil phase, wherein the oil phase is selected from the group consisting of hydrogenated castor oil, glyceryl monooleate, and a combination thereof;
    20 to 50% of an emulsifier, wherein the emulsifier is selected from the group consisting of polyoxyethylene castor oil EL35, polyoxyethylene 40 hydrogenated castor oil, and a combination thereof; and
    20 to 30% of a co-emulsifier, wherein the co-emulsifier is a mixture of ethanol and propylene glycol;
    or,
    2 to 20% of abiraterone acetate;
    20 to 50% of an oil phase, wherein the oil phase is selected from the group consisting of hydrogenated castor oil, glyceryl monooleate, and a combination thereof;
    20 to 50% of an emulsifier wherein the emulsifier is selected from the group consisting of polyoxyethylene castor oil EL35, Span 80, and a combination thereof; and
    20 to 30% of a co-emulsifier, wherein the co-emulsifier is a mixture of ethanol and propylene glycol;
    or,
    2 to 20% of abiraterone acetate;
    20 to 50% of an oil phase, wherein the oil phase is selected from the group consisting of glyceryl monolinoleate, medium chain triglyceride, and a combination thereof;
    8 to 50% of an emulsifier, wherein the emulsifier is polyoxyethylene castor oil EL35 or polyoxyethylene 40 hydrogenated castor oil; and
    20 to 60% of a co-emulsifier, wherein the co-emulsifier is diethylene glycol monoethyl ether;
    or,
    2.5 to 10% of abiraterone acetate;
    30 to 40% of an oil phase, wherein the oil phase is selected from the group consisting of glyceryl monolinoleate, medium chain triglyceride, and a combination thereof;
    10 to 30% of an emulsifier, wherein the emulsifier is polyoxyethylene castor oil EL35 or polyoxyethylene 40 hydrogenated castor oil; and
    30 to 50% of a co-emulsifier, wherein the co-emulsifier is diethylene glycol monoethyl ether.

2. The pharmaceutical composition according to claim 1, wherein, based on the total mass of the pharmaceutical composition, the pharmaceutical composition comprises the following components by weight:
    2.5 to 6% of abiraterone acetate;
    30 to 40% of the oil phase, wherein the oil phase is selected from the group consisting of glyceryl monolinoleate, medium chain triglyceride, and a combination thereof;
    15 to 20% of the emulsifier, wherein the emulsifier is polyoxyethylene castor oil EL35 or polyoxyethylene 40 hydrogenated castor oil; and
    40 to 50% of the co-emulsifier, wherein the co-emulsifier is diethylene glycol monoethyl ether.

3. The pharmaceutical composition according to claim 1, wherein the excipients further comprises:
    an antioxidant, a preservative, or a combination thereof; wherein the antioxidant or preservative account for 0.005% to 0.1% by weight of the total mass of the pharmaceutical composition respectively.

4. The pharmaceutical composition according to claim 3, wherein the antioxidant is selected from the group consisting of tert-butyl p-hydroxyanisole BHA, butylated hydroxytoluene BHT, and a combination thereof.

5. A method for treating prostate cancer, comprising administering the pharmaceutical composition according to claim 1 to a subject in need thereof.

6. The method according to claim 5, wherein the prostate cancer is selected from the group consisting of metastatic castration-resistant prostate cancer, high-risk metastatic castration-sensitive prostate cancer, and a combination thereof.

7. An abiraterone acetate capsule comprising a content and a capsule shell, wherein the content is the pharmaceutical composition according to claim 1.

8. The abiraterone acetate capsule according to claim 7, wherein the capsule shell is made of a hard capsule or soft capsule material.

9. The abiraterone acetate capsule according to claim 7, wherein a single oral dose is 25 to 200 mg of abiraterone acetate.

10. A pharmaceutical combination, wherein the pharmaceutical combination comprises:
    the pharmaceutical composition according to claim 1, and prednisone.

11. A pharmaceutical combination, wherein the pharmaceutical combination comprises:
    the abiraterone acetate capsule according to claim 7, and prednisone.

12. A method for treating prostate cancer, comprising administering the abiraterone acetate capsule according to claim 7 to a subject in need thereof.

13. The method according to claim 12, wherein the prostate cancer is selected from the group consisting of metastatic castration-resistant prostate cancer, high-risk metastatic castration-sensitive prostate cancer, and a combination thereof.

14. A method for treating prostate cancer, comprising administering the pharmaceutical combination according to claim 10 to a subject in need thereof.

15. The method according to claim 14, wherein the prostate cancer is selected from the group consisting of metastatic castration-resistant prostate cancer, high-risk metastatic castration-sensitive prostate cancer, and a combination thereof.

* * * * *